April 14, 1970   C. H. TURPIN ET AL   3,506,183
QUICK OPENING DOUGH CONTAINER
Filed May 21, 1968   5 Sheets-Sheet 1

INVENTOR.
CHARLES H. TURPIN
BY JAMES R. LEEZER
ATTORNEY

April 14, 1970   C. H. TURPIN ET AL   3,506,183
QUICK OPENING DOUGH CONTAINER
Filed May 21, 1968   5 Sheets-Sheet 3

INVENTOR.
CHARLES H. TURPIN
BY JAMES R. LEEZER

ATTORNEY

April 14, 1970   C. H. TURPIN ET AL   3,506,183
QUICK OPENING DOUGH CONTAINER
Filed May 21, 1968   5 Sheets-Sheet 4

INVENTORS
CHARLES H. TURPIN,
BY JAMES R. LEEZER

*James V. Horing*
ATTORNEY

United States Patent Office 3,506,183
Patented Apr. 14, 1970

---

3,506,183
QUICK OPENING DOUGH CONTAINER
Charles H. Turpin, Louisville, Ky., and James R. Leezer, Jeffersonville, Ind., assignors to The Pillsbury Company, Minneapolis, Minn., a corporation of Delaware
Continuation-in-part of application Ser. No. 687,786, Dec. 4, 1967. This application May 21, 1968, Ser. No. 742,995
Int. Cl. B65d 5/54, 3/00
U.S. Cl. 229—51      15 Claims

ABSTRACT OF THE DISCLOSURE

A cylindrical dough can including a body wall having a relatively strong longitudinal joint formed by overlapping and bonding together its marginal portions. Within the body wall is an impervious sealing liner having a weak but fluid impervious inner seal isolated from the longitudinal joint. A tearing member such as a tear string is aligned in the overlap area. When pulled, the string penetrates the complete thickness of the body wall thereby severing the strong longitudinal joint. The pressure exerted by the contents then breaks the inner seal.

---

This application is a continuation-in-part application of U.S. Ser. No. 687,786, filed Dec. 4, 1967. More particularly, the invention is directed to tubular containers that are adapted for use in merchandising pressurized biscuit dough.

The invention is particularly useful for packaging refrigerated biscuits, rolls, doughnuts and the like. Although in the foregoing examples, pressure is exerted on the inside of the container due to the leavening of the dough, the container can be used with contents that exert no pressure.

U.S. Patent No. 3,214,078 discloses a dough can having a longitudinal joint with a tear tab adjacent the lap joint. Although this container is highly satisfactory for most applications, the leakage of moisture, oil or gas from between the overlapped walls is sometimes a serious problem.

It is, therefore, an object of this invention to provide a simply constructed, easy opening, tubular container having a longitudinal joint and tear means aligned therein with an effective provision for eliminating the leakage of material through the overlapped layers of the body wall.

Another object of the invention is the provision of an improved container composed of a cylindrical body wall with sheet metal discs crimped to each end and a provision that allows the body wall to be cleanly and easily withdrawn from the crimped metal seam at the edge of each disc when the package is opened.

Another object of the invention is the provision of an improved easily opened pressure retaining container including a cylindrical body wall of substantially uniform thickness.

A further object of the invention is the provision of a pressure retaining can for dough products that when opened will more fully expose the contents, particularly the material adjacent the can ends so that they can be removed without being deformed.

Still another object of the present invention is the provision of an improved pressure retaining biscuit can that will not pop open with a loud noise.

These and other more detailed and specific objects will become apparent from the following description of the invention and drawings wherein.

To the accomplishment of the foregoing and related ends, the invention then comprises the features hereinafter fully described and particularly pointed out in the claims, the following description setting forth in detail certain illustrative embodiments of the invention, these being indicative, however, of but a few of the various ways in which the principles of the invention may be employed.

Figures 1, 2:
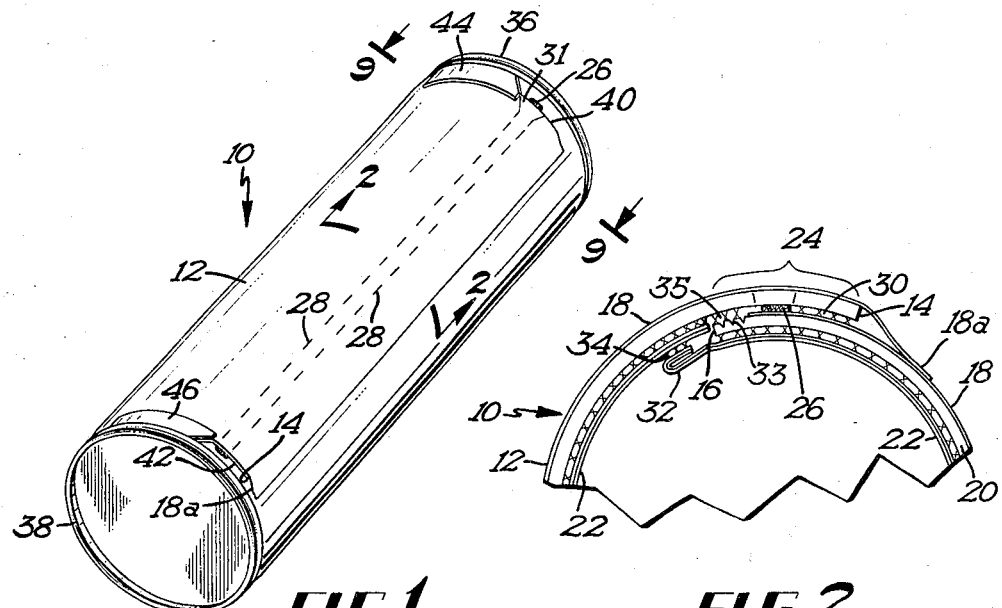
FIGURE 1 is a perspective view showing the preferred embodiment of the container.
FIGURE 2 is an enlarged partial sectional view taken along the line 2—2 of FIGURE 1.

The preferred embodiment of the tubular container 10 will now be described in connection with the figures. The container 10 consists of a body member 12 wound in convolute fashion with opposite edges 14 and 16 in overlapped relationship. The body member 12 consists of an outer label 18, a fibrous core 20 and an inner liner 22. The label, the core and the liner have their opposite edges out of registration as best seen in FIGURE 2. Both the inner linear 22 and the label 18 consist of aluminum foil laminated to kraft paper. The fibrous core 20 consists of standard paperboard stock of about .026 inch in thickness. The outer label 18, the fibrous core 20 and the inner liner 22 are bonded together with a suitable adhesive.

The edge designated 14 will hereinafter be referred to as the external edge and the edge designated 16 as the internal edge. These edges are positioned with the core material in overlapping relationship to form an overlay area designated 24. That portion of the fibrous core 20 extending the distance of the overlap area 24 from the external edge 14 is referred to as the external marginal portion. That portion of the fibrous core 20 extending from the internal edge 16 the distance of the overlap area 24 is referred to as the internal marginal portion. The overlap area 24 extends longitudinally the full length of the container. The amount of overlap 24 is uniform through the length of the container and will ordinarily be about 1½ inches. The core 20 is secured in its tubular form by provision of a glue line 30 defining a relatively strong adhesively bonded joint. The glue line 30 lies between the external edge 14 and the tearing means which will be described below and extends continuously substantially the full length of the overlap area.

A tear means consisting of a string 26 is bonded to the inner surface of the core 20 in the center of the overlap area 24. It extends the full length of the overlap area. When the string is pulled, the container wall will be ruptured along the dotted lines designated 28. If desired, perforations can be provided along the dotted lines 28 to facilitate removal of the portion of the body wall between them. The glue line 30 defines a relatively strong joint and as can be seen by reference, particularly to FIGURE 2, the glue line will transmit stress between the adjacent portions of the container wall on opposite sides of the overlap area 24. In practice, substantially the entire stress exerted against the package wall by the contents of the package will be withstood by the joint at the glue line 30.

Figures 3, 4, 5:
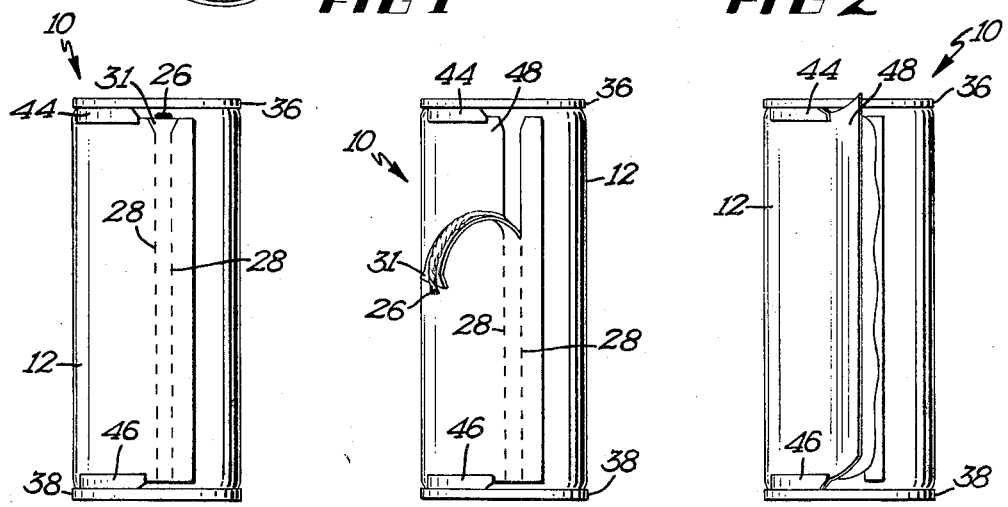
FIGURE 3 is an elevational view of the invention as it appears before being opened.
FIGURE 4 is an elevational view similar to FIGURE 3 with the tear means partly removed.
FIGURE 5 is a view similar to FIGURE 4 with the tear means completely removed and the package beginning to open.
Figure 6:
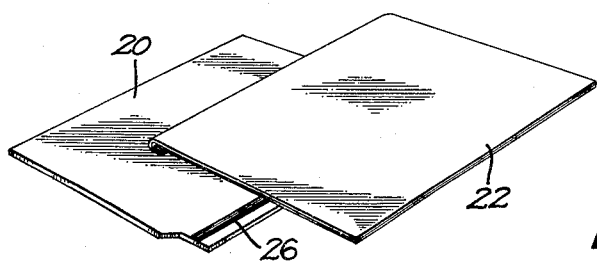
FIGURE 6 is an exploded perspective view showing the sealing liner separated from the body wall.
Figure 7:
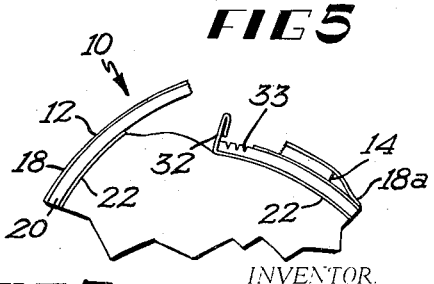
FIGURE 7 is a view similar to FIGURE 2 on a somewhat smaller scale as the container appears just after the tear means is removed.

To facilitate removal of the tear string 26 on the overlying portion of the body wall, suitable cuts can be made in the body wall to provide a starting tab 31 (FIGURES 1, 3 and 4).

Figure 8:
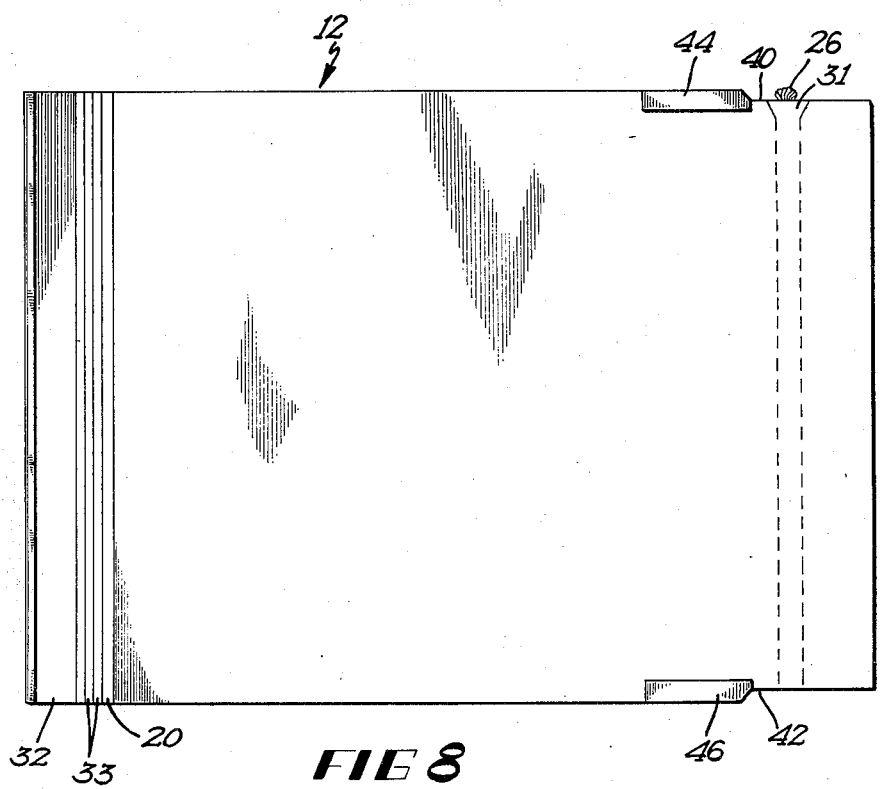
FIGURE 8 is a plan view of the composite container blank before being formed into a tube.

Refer now particularly to FIGURES 2 and 8 with reference to the liner 22. As shown in the figures, the liner is provided with an internal marginal extension 32 that projects somewhat beyond the internal marginal edge 16 and is parallel therewith. The extension 32 is doubled back on itself with its inward surface facing outwardly and is sealed to the liner 22 in the region adjacent to its opposite marginal edge along a seal designated 34. The seal 34 can be formed from any one of a number of suitable commercially available adhesives but preferably consists of a thermoplastic or thermosetting adhesive that is insoluble in liquids with which it would normally come in contact. Suitable sealing materials include heat sealing lacquers and heat sealing polyethylene compositions or the like. A variety of other heat sealing adhesives of a thermoplastic or thermosetting nature will be apparent to those skilled in the art. Any adhesive is suitable so long as it is strong enough to remain intact during shipment and is resistant to the penetration of liquids and gases retained under pressure in the product that is being shipped.

It will be noticed that the seal 34 is isolated from the seal 30. The seal 34 provides excellent resistance to leakage of materials from the inside of the container but has little mechanical strength because of the relatively weak character of the liner 22 and the strength of the bond itself is designed to peel at the bond area without the liner rupturing. It should also be noticed that it is spaced slightly from the seal 30 and has no structural connection with it. While the seal 34 can be positioned in radial alignment (registration) with the seal 30, this is not essential. It can, if desired, be spaced a short distance circumferentially in either direction from the seal 30, the only requirement being that it is close enough to seal 30 to open after the overlap area 24 has been ruptured and the container pulled open. The seal 34 will sometimes be spoken of hereinafter as adjacent to the seal 30. This expression will not exclude some circumferential spacing between the seal 30 and seal 34.

It should thus be understood that the seal 30 provides a requisite mechanical strength for the package while the isolated and entirely separate seal 34 provides the requisite resistance to the escape of liquids and gases. I have found that it is largely through the provision into two distinct and separate seals, one mechanical and one performing a barrier function, that the excellent results obtained have been made possible.

As shown best in FIGURES 1 and 2, a portion 18a of the label 18 extends beyond the external marginal edge 14 and is bonded to the body wall 12 for the purpose of protecting the external marginal edge from exposure to moisture and mechanical abrasion. It also helps to improve the appearance of the container.

Adjacent to the internal marginal edge 16 the outward surface of the core material 20 is roughened in a suitable manner. This can be conveniently accomplished by providing a plurality of parallel shallow cuts 33. A second glue line 35 which consists of longitudinally spaced glue spots is provided to form a relatively weak tacking bond. The glue line 35 should have just sufficient strength to maintain the package in a sealed condition for the period of time during which the tear string and the overlying portion of the body member 12 is being removed but is easily ruptured as the can is peeled open. It was found that the seal 35 is highly effective in preventing the bursting of cans that contain products of somewhat higher pressure than normal as the string is being removed.

Figure 9:
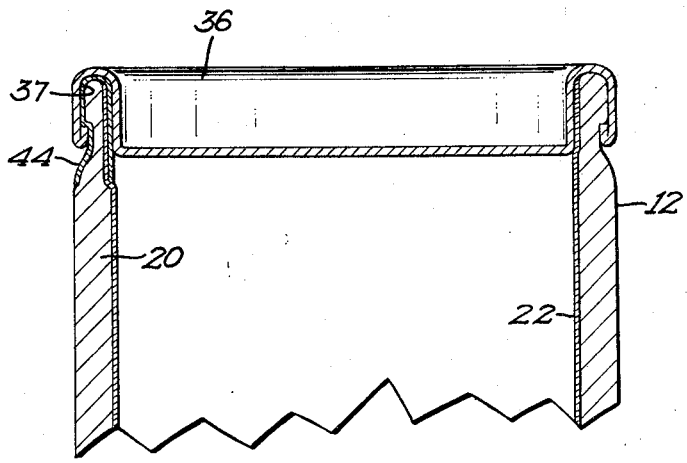
FIGURE 9 is a partial vertical sectional view taken on line 9—9 of FIGURE 1.

After the tubular container is filled with dough or other material, the end closures which comprise sheet metal discs are attached by crimping the free edges of the tubular container within annular retaining channels 37 (FIGURE 9). The container is then ready for storage or shipment. In the event it is used for the packaging of pressurized dough, it is sold through retail outlets to the consumer.

When the package is to be opened, the tab 31 and the end of the string 26 are grasped manually. The string is then pulled and the portion of the container body 12 in the center of the overlap section 24 adjacent the string 26 is removed as shown in FIGURE 4. The removal of the tear string continuously severs the body member 12 and destroys the effect of the glue line 30 and leaves only the structural rigidity imparted to the container by the end closures 36 and 38 and by the tacking bond formed by glue line 35. As the string 26 is removed, a pull tab 48 is defined. By lifting the pull tab 48, the container is opened.

If desired, the corners of the body wall 12 can be cut away to provide notches 40 and 42 having edges which are parallel to the top and bottom edges of the blank but are spaced inwardly a short distance from the end closures 36 and 38 after they have been applied. Adjacent to the notches 40 and 42 are two optional protecting elements 44 and 46 which cover both the inside and outside surface of the container body adjacent to the notches. The protecting elements serve to strengthen the container wall as well as to render the surface slippery so that it can be readily removed from the annular channels 37 when the tab 48 is pulled upwardly. When the notches 40 and 42 are not used, diagonal score lines are provided in the same location as the diagonal portion of each of the notches 40 and 42.

To open the container, the tab 48 is grasped and pulled and as the external marginal edge portion is lifted, the portions of the body wall that are held tightly within the crimped portions of the closures 36 and 38 can be removed from the channels owing to the slippery character of the protecting elements 44 and 46. The edges of the body wall within the channels 37 are preferably of just sufficient length so that they do not overlap at their ends.

Figure 10:
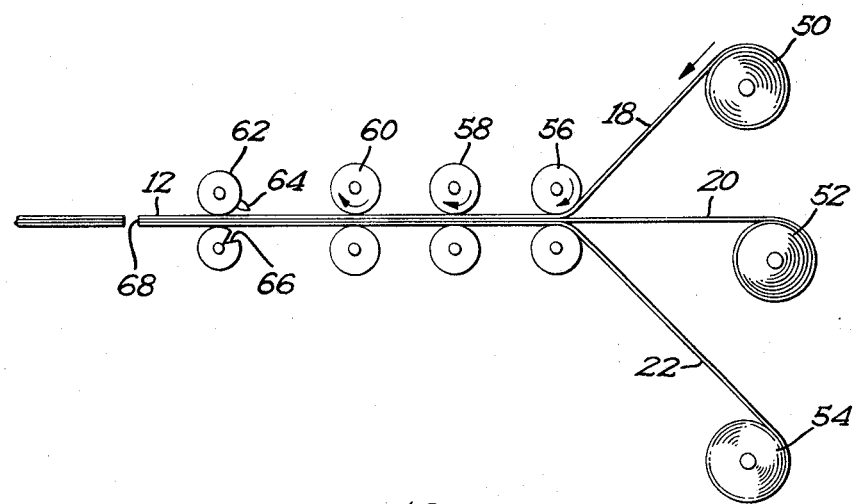
FIGURE 10 is a diagrammatic side elevational view of a preferred form of apparatus for assembling the composite body wall material.
Figure 11:
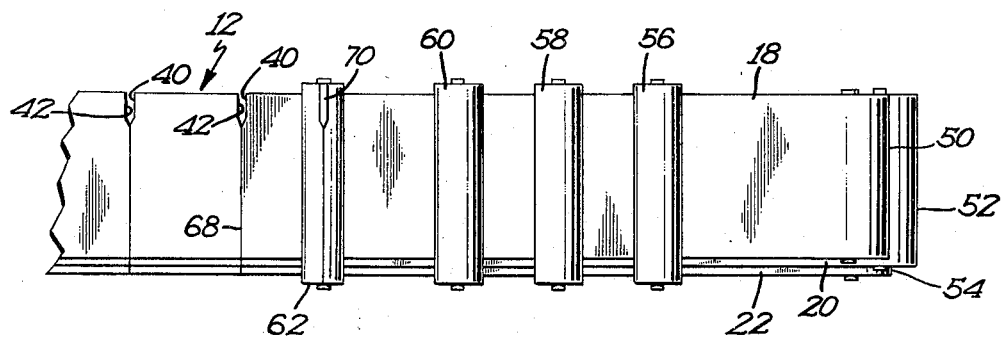
FIGURE 11 is a partial plan view of the apparatus of FIGURE 10.

Refer now to FIGURES 10 and 11 which illustrates a preferred method of forming the composite container body wall 12. As shown in the figures, label stock 18 is unwound from a supply roll 50 and is combined with the core material 20 and the liner 33 which are supplied from rolls 52 and 54 respectively. Adhesive is suitably applied as the respective layers of the laminate are advanced toward a pair of cooperating parallel rotatable rolls 56. Two additional pairs of rolls 58 and 60 are also provided and each is driven in given feed directions by motors which are not shown. After passing through the last pair of rolls 60, the composite sheet is fed through a cutter 62 which consists of vertically spaced parallel rotatable rolls provided with a cutting blade 64 and a cooperating recess 66 adapted to cut the sheet at longitudinally spaced intervals as seen at 68. One end of the blade 64 is bifurcated as seen at 70 in FIGURE 11 to produce the notches 40 and 42.

As best seen in FIGURE 11, the label stock 18, the fiber core and the liner stock 22 are run slightly out of alignment to provide the required extension 32 of the liner and the exposed area of the fiber core stock 20.

The optional protecting elements 44 and 46 are then applied. These elements when used can consist either of a thin coating of plastic or similar material applied by brushing or spraying or by the application of a layer of sheet material such as cellulose acetate or the like. If a thin layer of sheet material is applied, it can be bonded to the underlying body wall 12 with a suitable adhesive.

The cut blanks of body wall material 12 are then fed through the tubing apparatus of a suitable known construction to form the seal in the direction of travel shown in FIGURES 10 and 11.

As the tubing operation is performed the seals 30, 34 and 35 are formed. The foregoing is a description of the preferred embodiment of the invention. It may take other forms. The overlap area need not necessarily extend parallel to the axis of the container but can extend helically.

The glue line 35 is preferably but not necessarily used in addition to the blue line 30. Glue line 35 imparts greater strength to the overlap area. It must be weak enough, however, to allow almost immediate rupture of the overlap after the tear strip is removed and a gentle opening force is applied manually. Both glue lines 30 and 35 may take the form of lines as opposed to strips and may cover the entire overlap area with the exception of surface of tear means 26.

The tear means may take other forms. It can, for example, consist of two parallel lines of circular perforations or of a single line of perforations. Such perforations need not necessarily completely penetrate body member 12 but the complete penetration of fibrous core 20 is preferred.

Body member 12 need not necessarily include an outer label 18. If the label is omitted, the outside surface of the core 20 can be printed with the name of the product and the directions for its use.

Refer now to FIGS. 12–16 which illustrate a preferred embodiment of the invention. In this form of the invention, the container designated generally by the number 200 consists of a cylinder formed from a flexible sheet material composed of a laminate designated 202 (FIGURES 15 and 16) consisting of two relatively thick interior sheets 204 and 206, i.e. .014 inch thick fiberboard, which are suitably bonded to one another by an adhesive 208 that can be applied either in selected areas or over the entire contacting surfaces. The sheets 204 and 206 are positioned relative to one another such that their upper and lower edges 210 and 211 respectively are positioned in alignment with each other. The longitudinally extending edges, however, are positioned out of alignment to provide circumferentially extending inner tab 212 and a circumferentially extending overlapping tab 214 which lies adjacent to the outer surface of a tab 212.

An internal liner 216 formed preferably of a barrier such as a laminate composed of aluminum foil bonded to kraft paper and adapted to prevent the penetration of water and grease is glued preferably over substantially its entire surface to the inner layer 206. A label 209 formed preferably from substantially the same material as the linear 216 is bonded to the exterior surface of sheet 204. The label is normally printed.

Figure 14:
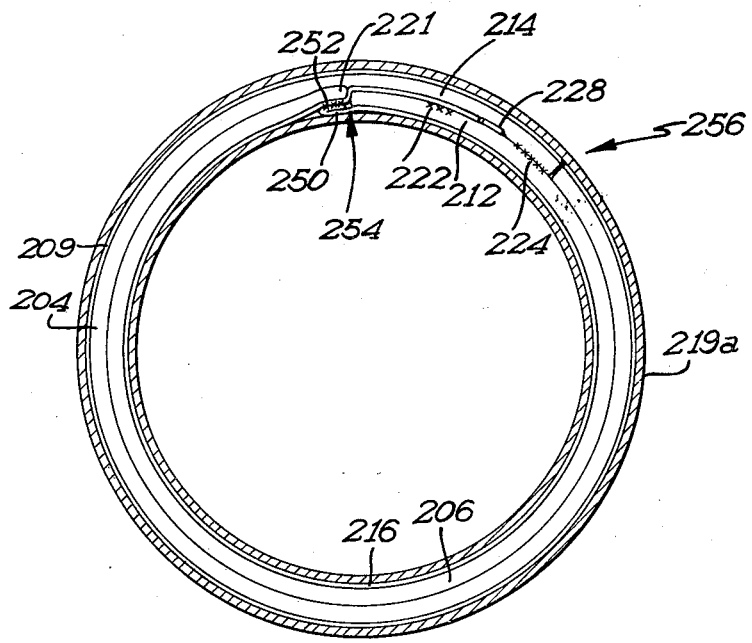
FIGURE 14 is a transverse sectional view taken on line 14—14 of FIGURE 15.

As seen in FIGURE 14, the liner 216 extends somewhat beyond the free end of the tab 212. The free edge of the liner 216 is designated 250. The free edge portion 250 is folded back upon itself to provide a longitudinally extending free hem which is bonded by means of adhesive 252 to the overlying liner material to provide a relatively weak but substantially gas and liquid tight seal. The cut edges of the tabs 212 and 214 are positioned closely adjacent to each other to define extending circumferentially spaced butt joints 254 and 256.

The bottom closure 22° consists of a thin sheet metal disc crimped or seamed at 220a in a conventional manner to the bottom edge 211 of the can body. After the bottom closure 220 has been applied, the biscuits 223 are placed in the container and the top closure 219 is applied and crimped, i.e. seamed at 219a in a conventional manner to the top edge 210 of the body stock.

Figure 12:
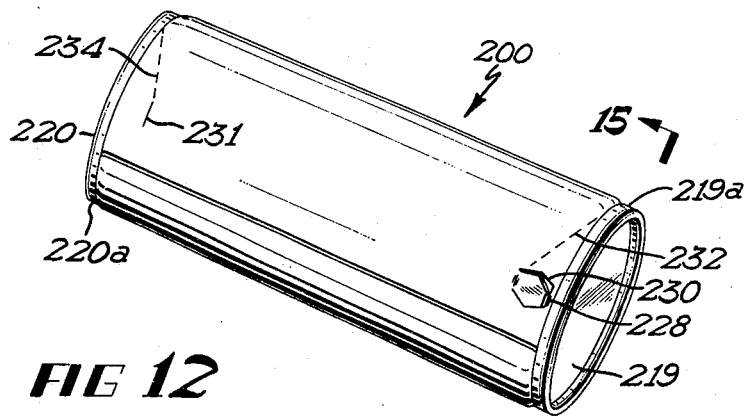
FIGURE 12 is a perspective view of another embodiment of the invention.
Figure 13:
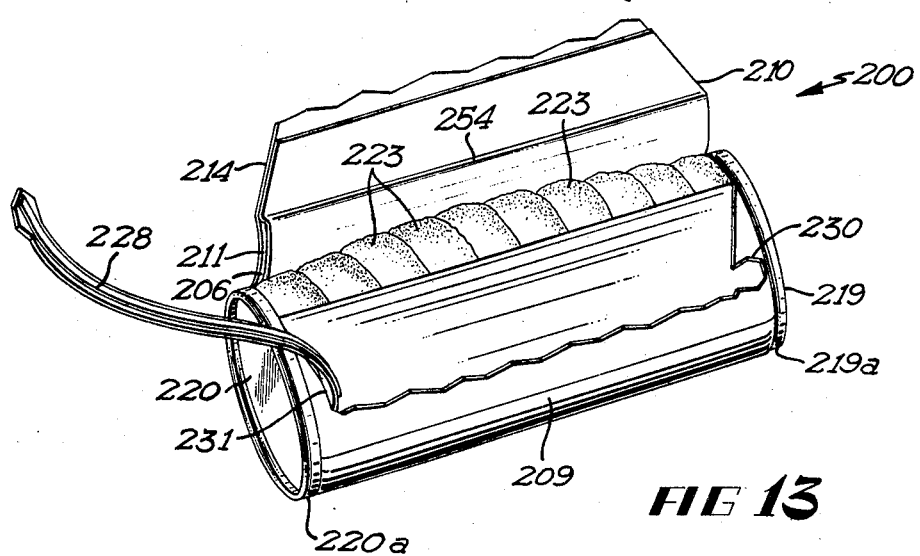
FIGURE 13 is a perspective view of the container of FIGURE 12 immediately after being opened.

As seen in FIGURE 14, the overlapping tab 214 is bonded to tab 212 by means of a longitudinally extending line of adhesive 224 adjacent the extreme marginal end portion of the overlapping tab 214. Spaced slightly from the line of adhesive 224 and suitably bonded to the inner surface of tab 214 is a tear means consisting of a tape or string 228. As shown in FIGURES 12, 13 and 14, tab 214 has a C-shaped cut 230 through sheet 204 and label 209 extending around one end of the tape 228 so that said end can be easily grasped. A straight cut 231 is made at the other end.

Two diverging lines of perforations designated 232 and 234 are made in the overlying tab 214. These perforations extend diagonally from points adjacent the ends of the tape 228 to the top and bottom edges 210 and 211 to form tear lines that facilitate peeling back of the overlying tab 214 when the package is to be opened. As seen in FIGURE 13, the junction between perforation lines 232 and 234 and the metal ends 219 and 220 is located in alignment with the internal butt joint 254 to assist in the removal of the first portion of the cut edges 210 and 211 from the seams 219a and 220a.

The opening of the package will now be described. The tear tape 228 is pulled from right to left as seen in FIGURE 13 thereby freeing tab 214. As shown in FIGURE 13, the overlying tab 214 and its attached label 209 is grasped and pulled toward the left in the figure. As this is done, the tab 214 and label 209 tear along lines 232 and 234 until the tear reach the seams of end closures 219 and 220. As the body wall is pulled further in a counterclockwise direction as seen in FIGURE 13, the upper and lower edges 210 and 211 of the body wall will pull evenly and smoothly from the seams of the bottom closure 220 and top closure 219.

Figure 16:
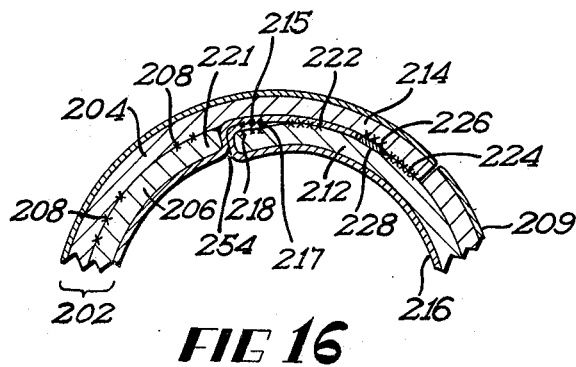
FIGURE 16 is a partial cross sectional view of a modified form of longitudinal seal.
Figure 15:
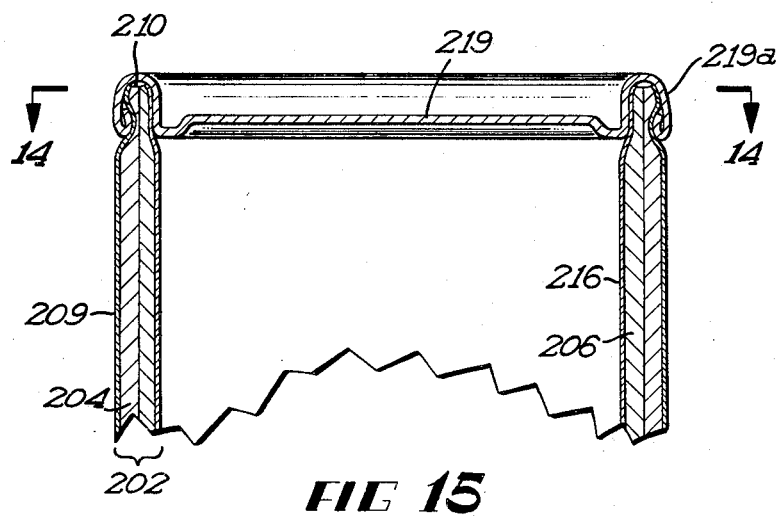
FIGURE 15 is a partial vertical sectional view of the container of FIGURES 12-14 on line 15—15 of FIG-12.

Refer now to FIGURE 16 which illustrates a modified form of construction in accordance with the invention. All of the same components are employed as described in FIGURES 12, 13 and 14 and the same numbers have been used to designate corresponding parts.

In this embodiment, the edge of the liner 216 adjacent the underlying tab 212 extends somewhat beyond the cut edge thereof, is folded outwardly to provide a hem 217 and is bonded to the outer surface of sheet 206 by means of an adhesive designated 218. The outer surface of the hem 217 is bonded to the outer tab 214 by adhesive 215. The other end of the liner adjacent the overlying tab 214 is pressed into the recess defined by the cut end 221 of the inner layer 206 and is bonded to the external surface of the underlying tab 212 by adhesive 222. The adhesive 222 is optional. The glue line 222 provides a tacking bond similar to the tacking bond 35 described hereinabove and is preferably formulated to provide a relatively high shear strength and peel strength sufficient to prevent immediate opening of the can after the tape 228 has released tab 214 but weak enough so as to be easily ruptured by peeling back the tab 214.

The package of FIGURE 16 is filled and closed as described hereinabove in connection with FIGURES 12–15. The container illustrated in FIGURE 16 is opened in the same manner described in connection with FIGURES 12–15. Briefly, the tape 228 is lifted thereby severing the overlapping tab 214 adjacent the bond 224. The adhesive designated 222 provides a temporary tacking bond between the liner 216 and the tab 214. As the free edge of tab 214 is pulled in a direction adapted to open the package (counterclockwise as seen in FIGURE 16), the adhesive 222 will be broken and continued movement of tab 214 toward the left in the figure will then break the bond 215 sealing the liner 216 to itself. As described above, the substantially constant thickness of the container wall will facilitate the smooth removal of the container wall from the seams 219a and 220a as the package is opened.

The invention has a number of advantages as described hereinabove. Two of the most important are the ease of opening and the more complete opening of the container 200, in particular the improved access provided to the biscuits immediately adjacent the ends of the can which results from the peeling or sliding out of the edges 210 and 211 from the seams.

We claim:

1. A pressure retaining tubular container comprising a substantially cylindrical fibrous core having an internal and external edge, an internal marginal portion adjacent said internal edge and an external marginal portion adjacent said external edge, said external marginal portion overlapping and contacting said internal marginal portion to form an overlap area extending the full length of the core, a tear means extending the full length of the overlap area aligned in said overlap area for continuously severing the external marginal portion, a first adhesive joint in the overlapped area between said tear means and said external edge, the removal of the tear means being adapted to disengage the first joint, a liner positioned inside said fibrous core, said liner being composed of an impervious flexible sheet material and having a pair of parallel longitudinally extending edges positioned adjacent the overlap area and extending the full length of the core, said parallel edges of the sheet material being bonded together to define a second joint, said second joint being mechanically weak but having a fluid impervious seal extending the full length of the container to prevent the escape of material from the container, said second joint being isolated from the first joint whereby the first joint provides the requisite mechanical strength of the package and the second adhesive joint provides the requisite resistance to the escape of gases, liquids and solids and at least one end closure secured to at least one end of the core.

2. The container according to claim 1 wherein an end closure member is crimped to each end of the tubular container and protecting means is applied to the core adjacent the ends of the tubular container to facilitate the removal of the edges of the core from each said end closure member.

3. The container according to claim 2 wherein the protecting means comprises the coating of a polymeric material.

4. The container according to claim 3 wherein the protecting means comprises a layer of a slippery sheet material bonded to the edge of the container wall.

5. The container according to claim 1 wherein an end closure is crimped to the tubular container to provide ends for the container and the portion of the fibrous core adjacent to the cut away portions is covered by a protecting element to facilitate the removal of the free edge of the core from the position in which it is crimped in the end closure.

6. The container of claim 1 wherein the core is composed of two pieces of sheet material bonded together with the longitudinally extending parallel edges thereof out of alignment to define an external tab and an internal tab, said internal marginal portion comprising the internal tab and the said external marginal portion comprising the external tab and the longitudinally extending edges of each of the sheets making up the core being positioned in abutting relationship with the opposite edge of the same sheet, the abutting edges defining circumferentially spaced external and internal butt joints whereby said cylindrical core is substantially constant in thickness throughout its circumference.

7. A pressure retaining tubular container comprising a core defined by at least a pair of flexible sheets bonded together with two parallel edges out of alignment, the misaligned edges defining circumferentially projecting radially aligned tabs, said core being formed into a cylinder with the tabs adjacent one another, one tab comprising an external tab and the other tab comprising an internal tab and the opposed longitudinally extending edges of each sheet being positioned adjacent to the opposite edge of the same sheet to define an external butt joint and an internal butt joint and a tear means extending longitudinally of the container for continuously severing the external tab means bonding the marginal portion of the external tab to the underlying material to form a strong joint for normally holding the container together, whereby the container can be opened by lifting a portion of the outer tab adjacent to the tear formed when the tear means is used and at least one disc secured to the end of the cylinder.

8. The container according to claim 7 wherein one said disc is crimped to each end of the cylindrical fibrous core by means of circumferentially extending seams and the lifting of said portion of external tab following the operation of the tear means being adapted to withdraw the circumferentially extending edges of the fibrous cylinder out of the circumferentially extending seam of the disc whereby the contents of the container is exposed in the area immediately adjacent to the inner surface of the discs.

9. The container according to claim 8 wherein an inner liner formed from an impervious flexible sheet material is bonded to the inside of the innermost of the flexible sheets, said liner having longitudinally extending adjacent edges, the longitudinally extending edges of the liner being bonded together to provide a longitudinally extending seal for preventing the escape of material from the container.

10. The container according to claim 9 wherein one edge of the liner is folded outwardly beyond the cut edge of the internal tab and is folded back over the outer surface of the internal tab and is bonded thereto and the outer surface of the folded back portion is bonded to the overlying adjacent material.

11. The container according to claim 7 wherein the external tab is sealed to the internal tab along a longitudinally extending seal line positioned at the extreme marginal edge portion of the external tab, a tear means is positioned adjacent to said seal and extends longitudinally of the container for removing a portion of the external tab adjacent to the longitudinally extending seal whereby the free portion of the external tab can be peeled circumferentially after the tear means has severed the outer tab and the continued peeling back of the free portion of the external tab being adapted to withdraw the circumferentially extending edges of the flexible sheets from the retained position within the circumferentially extending seams at each end of the container.

12. The container according to claim 11 wherein a tacking bond is provided between the external and internal tabs on the opposite side of the tear means from the longitudinally extending seal for temporarily bonding the internal and external tabs together following the operation of the tear means.

13. The container according to claim 7 wherein a liner is bonded to the inner surface of the innermost flexible sheet, said liner having a first edge portion that is bonded to the inner surface of the external tab and a second edge portion opposite said first edge portion which is folded back upon itself to define a hem and the outer surface of the hem being bonded to the adjacent surface of the overlying liner material to define an impervious seal for preventing the escape of material from the container.

14. A pressure retaining tubular container comprising at least a pair of flexible sheets bonded together with two parallel edges out of alignment, the misaligned edges defining circumferentially projecting radially aligned tabs, said core being formed into a cylinder with the tabs adjacent one another, one tab comprising an external tab and the other tab comprising an internal tab and the opposed longitudinally extending edges of each sheet being positioned adjacent to the opposite edge of the same sheet to define an external butt joint and an internal butt joint and a tear means extending longitudinally of the container for continuously severing the external tab means bonding the marginal portion of the external tab to the underlying material to form a strong joint for normally holding the container together, whereby the container can be opened by lifting a portion of the outer tab adjacent to the tear formed when the tear means is used.

15. A pressure retaining tubular container comprising a tubular body wall composed of flexible sheet material, a tear means within the body wall and extending generally longitudinally thereof for opening the container, said tear means including means for severing at least a portion of the body wall along a line extending generally longitudinally thereof to provide a substantially longitudinally extending free flap which can be grasped by the user to open the package by pulling the free flap circumferentially, said tubular body wall having upper and lower circular edges positioned normal to the axis of the tube, a pair of relatively thin circular end closure elements, each such closure element being removably crimped around its circumference to one edge of the tube, the crimped portion of each closure element comprising a circular recess enclosing one end of the tube, said flap being of sufficient strength so that the force exerted by the user in pulling the flap circumferentially will slide said circular edges out of the circumferentially extending crimped portion of each closure element to thereby withdraw the body wall from each recess as the container is opened.

References Cited

UNITED STATES PATENTS

| | | | |
|---|---|---|---|
| 1,973,317 | 9/1934 | Hurley | 229—4.5 |
| 2,858,057 | 10/1958 | Mullinix. | |
| 3,157,337 | 11/1964 | Elam | 229—4.5 |
| 3,182,891 | 5/1965 | Ecklund et al. | |
| 3,185,577 | 5/1965 | Krause. | |
| 3,214,078 | 10/1965 | Leezer. | |
| 3,221,975 | 12/1965 | Zoeller et al. | |
| 3,241,739 | 3/1966 | Ahlemeyer. | |
| 3,300,118 | 1/1967 | Owens. | |

DAVIS T. MOORHEAD, Primary Examiner

U.S. Cl. X.R.

138—151; 199—172; 229—4.5